April 23, 1968 — O. BRUMMER ETAL — 3,379,444
FLUID SEAL STRUCTURE
Filed Jan. 9, 1961 — 2 Sheets-Sheet 1

Inventors:
Olin Brummer and
John Talamonti
By: John W. Butcher
Atty.

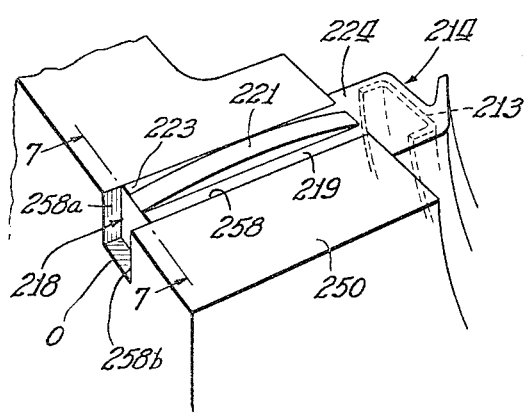
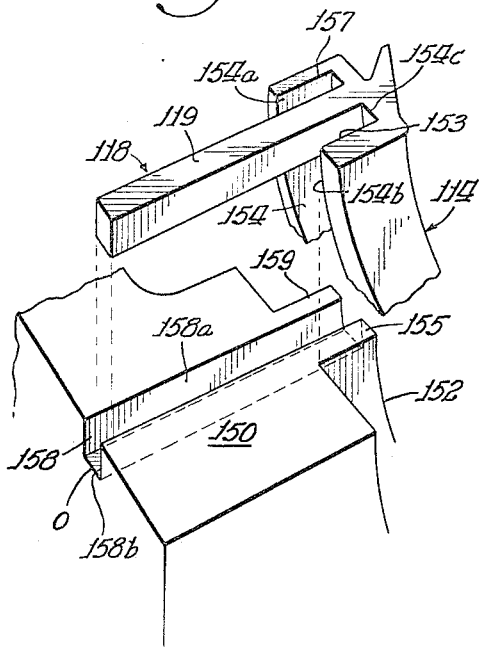
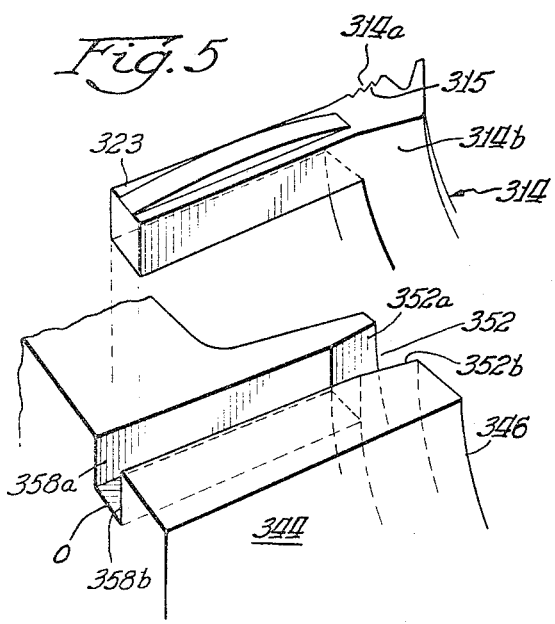
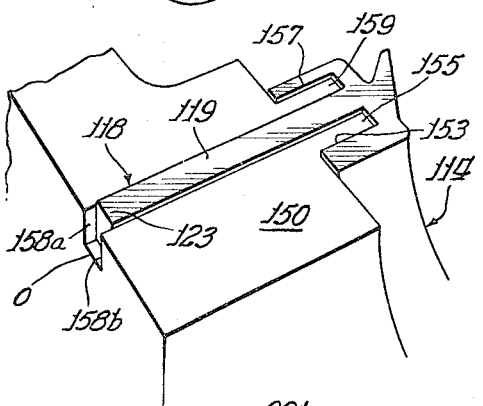
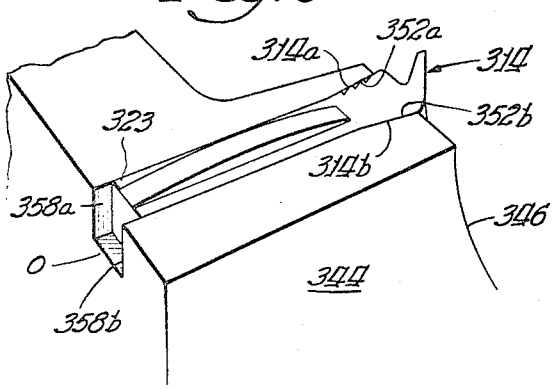
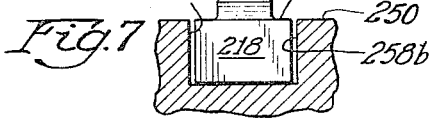

United States Patent Office 3,379,444
Patented Apr. 23, 1968

3,379,444
FLUID SEAL STRUCTURE
Olin Brummer and John Talamonti, Chicago Heights, Ill., assignors to Borg-Warner Corporation, Chicago, Ill., a corporation of Illinois
Filed Jan. 9, 1961, Ser. No. 81,472
5 Claims. (Cl. 277—58)

This invention relates to liquid seals and more particularly to an improved oil liquid seal structure especially adapted to embrace a rotating shaft, such for example as the crankshaft of an internal combustion engine.

In seal structures heretofore employed, serious difficulty has been encountered in accomplishing an effective liquid seal between the rotating shaft and the seal structure as well as between the parting faces of the two halves of the support for the bearing and seal structure. In addition, there has existed a serious problem in accomplishing the proper installation of available seal structures; with the resultant unreliable functioning of these seal structures when installed. Cross-seals have been placed between the parting faces of the two halves of the seal structure support. Normally, these cross-seals extend outwardly in a radial direction from the perimeter of the arcuate shaft seal and are placed in grooves in the parting face of the seal structure support.

Prior to the present invention it was the common practice to employ separate and independent component parts for the seal structure. That is, the cross-seal components and the shaft-seal components were fabricated as separate items. Thus, as the oil seal structure was installed in the seal structure support it was necessary to install the shaft-seal component in its appropriate position and then to install the cross-seal component in the seal structure support in its appropriate position.

A careful study of the endurance of seal structures having independent cross-seal components and independent shaft-seal components led to the discovery that premature failure of the seal structure could be attributed to a parting of the individual components between the perimeter of the shaft seal and the inner terminal end of the cross-seal.

Briefly described this invention relates to the provision of a one-piece (integral) liquid seal structure having the critically important function of preventing the migration of the cross-seals within the cross-seal grooves. The seal structure includes a semi-circular ring-like shaft-seal portion formed at least in part of an elastomeric material. The shaft seal portion has a flexible oil retaining lip formed integrally with the shaft-seal portion. This lip is adapted to embrace and to engage a rotatable shaft in liquid sealing relation therewith. A pair of oppositely extending spoke-like cross-seal portions formed at least in part of an elastomeric material are molded integrally with the shaft-seal portion and extend from the terminal ends of the shaft-seal portion. The pair of spoke-like cross-seal portions are positioned in a groove formed in the parting face of the seal structure support and are adapted to fill the groove completely when the seal structure support is installed in a normal operating position. The pair of spoke-like cross-seal portions prevent the passage of liquid between the parting faces of the seal structure support in a zone between the shaft-seal portion and the spoke-like cross-seal portion. Particular attention is called to the fact that with the integral liquid seal structure disclosed herein fluid cannot gain access between the inner end of the cross-seal portion and the perimeter of the shaft-seal portion. This particular feature prevents fluid pressure from acting against the inner terminal end of the cross-seal. This in turn prevents the cross-seal from migrating radially outwardly in the groove and eliminates the creation of a void space between the perimeter of the shaft-seal and the cross-seal and this in turn eliminates the loss of liquid from the crankcase.

Reference will now be made in greater detail to the specific features of construction illustrated in the figures of the drawings wherein:

FIGURE 2 is a partial view of a particularly preferred embodiment of the cross-seal portion and the shaft-seal portion of the integral seal structure.

FIGURE 3 is a partial view of a preferred embodiment of the integral seal structure wherein the integral seal structure is removed from its position in the seal structure support.

FIGURE 4 is a partial view of the embodiment shown in FIGURE 3 wherein the integral seal structure is positioned within the seal structure support.

FIGURE 5 is a partial view of an alternate embodiment of an integral seal structure wherein the seal structure is removed from its position in the seal structure support.

FIGURE 6 is a partial view of the embodiment shown in FIGURE 5 wherein the seal structure support is positioned within the seal structure support, and FIGURE 7 is an end view of the cross-seal portion within its complementary groove.

Figure 1:
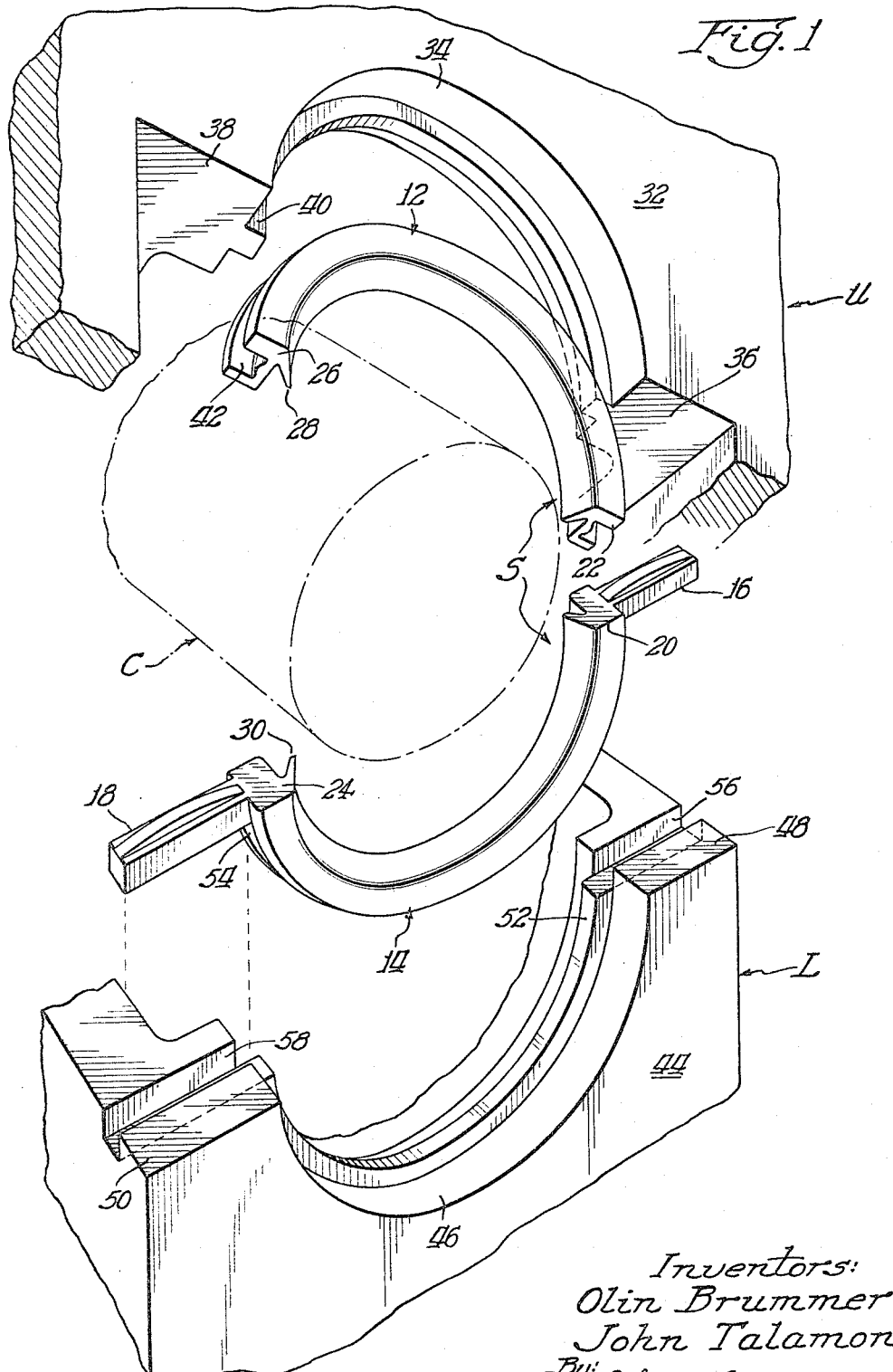
FIGURE 1 is an exploded view, partially in cross section, illustrating the seal structure with the associated engine parts.

Referring to the drawings, and more particularly to FIGURE 1, an oil seal structure S is illustrated as removed from its normal position between the upper part U and the lower part L of the seal structure support which seal structure support normally surrounds a crankshaft C.

The seal structure includes an upper shaft seal portion 12, a lower shaft seal portion 14, a first cross-seal portion 16 and a second cross-seal portion 18. A first lower terminal end 20 of the lower shaft-seal portion 14 is adapted to engage a first upper terminal end 22 of the upper shaft-seal portion 12. A second lower terminal end 24 of the lower shaft-seal portion 14 is adapted to engage a second terminal end 26 of the upper shaft-seal portion 12.

An integrally formed flexible upper oil retaining lip 28 is formed on the upper shaft-seal portion 12. This upper retaining lip 28 is adapted to embrace the crankshaft C and is adapted to form a fluid-tight fit with the crankshaft C. A lower integrally formed flexible oil retaining lip 30 is formed on the lower shaft-seal portion 14. This lower retaining lip 30 is adapted to embrace the crankshaft C and is adapted to form a fluid-tight fit with the crankshaft C.

The upper part U includes an upper body portion 32 which has an upper arcuate portion 34, a first upper parting face 36 and a second upper parting face 38 formed therein. An upper protruding rib 40 is formed on the upper arcuate portion 34 and extends radially inwardly therefrom. This upper protruding rib 40 is adapted to fit within an upper complementary shaft-seal groove 42 formed in the upper shaft-seal portion 12.

The lower part L of the seal structure support includes a lower body portion 44 which has formed therein a lower arcuate portion 46, a first lower parting face 48, and a second lower parting face 50.

A lower protruding rib 52 is formed on the lower arcuate portion 46 and is adapted to fit within a lower complementary shaft-seal groove 54 formed in the lower shaft-seal portion 14. A first cross-seal groove 56 is formed within the first lower parting face 48 and is adapted to receive the first cross-seal portion 16. A second cross-seal groove 58 is formed in the second lower parting face 50 and is adapted to receive the second cross-seal portion 18.

Referring now to FIGURES 3 and 4 the second cross-seal portion 118 is illustrated as formed integral with the lower shaft-seal portion 114 such that the second cross-seal portion 118 joins the lower complementary shaft-seal groove 154 intermediate a pair of axially spaced flexible sides 154a and 154b at the bottom portion 154c thereof. A first annular passageway 153 is adapted to fit about the first rib end 155 of the lower protruding rib 152. The first rib end 155 is formed by intersection of the second cross-seal groove 158 and the lower protruding rib 152. A second annular passageway 157 is adapted to fit about a second rib end 159 of the lower protruding rib 152. The second rib end 159 is formed by intersection of the second cross-seal groove 158 and the lower protruding rib 152. The top surface 119 of the second cross-seal portion 118 preferably extends slightly above the second lower parting face 150. The cross-seal portion preferably does not fill the groove completely when placed therein in a noncompressed state. The volume of material extending above the parting face is preferably equal to the difference of the volume of the groove minus the volume of the one groove occupied by the cross-seal portion within the groove when the cross-seal portion is in a noncompressed state. The tolerance between the cross-seal portion and the groove aids in the installation of the seal structure. FIGURES 2, 4, and 6 illustrate an embodiment wherein the cross-seal portion fits snugly within the groove side walls 158a, 158b, 258a, 258b, 358a and 358b and wherein the outer terminal end 123, 223, and 323 does not extend to the outer terminal end of the groove. Alternatively the volume defined by the tolerance between the cross-seal sides and the groove side walls (FIG. 7) may be about equal to the volume of material in the cross-seal portion extending above the parting face when the cross-seal (non-compressed) is installed in the cross-seal groove. Tests data indicate optimum sealing is obtained when the tolerance volume—preferably equal to the volume of material in the raised portion—is from about 2.5% to about 12.5% and preferably from about 5% to about 10% of the volume of the groove.

Thus as the two halves of the seal structure support are assembled, the cross-seal portions are compressed and are compelled to flow downwardly and outwardly in their complementary grooves thus filling the groove and forming an effective seal between the parting faces and preventing the flow of fluid therepast.

Referring now to FIGURE 2, the second cross-seal portion 218 is illustrated as formed integral with the lower shaft-seal portion 214 such that it joins the second lower terminal end 224 of the lower shaft seal portion 214 at the outer arcuate perimeter thereof. The second cross-seal portion 218 preferably fits within a second cross-seal groove 258 such that the top surface 219 of the second cross-seal portion 218 is substantially flush with, or level with, the second lower parting face 250. The second cross-seal portion 218, as illustrated, preferably includes a raised portion 221 which portion extends longitudinally from a point near the outer arcuate perimeter of the lower shaft seal portion 214 along the top surface of the second cross-seal portion 218 intermediate the sides thereof to a point near the outer terminal end 223 of the second cross-seal portion 218.

The total volume of the cross-seal portion (including the volume of the raised portion) desirably is equal to the volume of the groove. The optimum tolerance volume is from about 2.5% to about 12.5% and preferably from about 5% to about 10% of the volume of the groove. The raised portion preferably extends longitudinally along the top surface of the cross-seal portion from a point near the outer perimeter of the shaft seal portion to a point near the outer terminal end of the cross-seal portion such that it lies intermediate the sides of the cross-seal portion terminating in the top surface of the cross-seal portion remote from the sides thereof. The quantity of material in the raised portion preferably increases in a direction from the inner end of the cross-seal portion toward the midpoint thereof and decreases in a direction from the midpoint toward the outer terminal end of the cross-seal portion.

Referring now to FIGURES 5 and 6, the shaft-seal portion 314 is illustrated as being adapted to fit within a recess 352 which recess is formed in the arcuate portion 346 of the lower body portion 344. The opposite sides 352a and 352b of the recess 352 preferably extend outwardly at an angle to each other to form a tapered recess for receipt of the sides 314a and 314b of the tapered shaft-seal portion 314. Either of the sides 314a or 314b of the tapered shaft-seal portion 314 may have saw tooth shaped ridges 315 formed therein to restrict the movement of the shaft-seal portion 314 with respect to the lower body portion 344.

The cross-seal groove may be formed in either the upper parting surface or in the lower parting surface or a combination thereof wherein a portion of the groove extends into both the upper and the lower parting faces. Experience has indicated that better results can be obtained by making the cross-seal groove in the lower parting faces of the seal-structure support.

The shaft-seal portion and/or the cross-seal portion may have reenforcing material 213 (FIGURE 2) placed therein as is well known to those skilled in the art.

It is to be understood that while the present invention has been disclosed as having a particular and unique application to the crankshaft of an internal combustion engine, it is also contemplated that in its broader aspects the present invention is applicable to other environmental situations wherever the same or like problems exist.

We claim:

1. A liquid seal structure for use within a two-piece semi-circular shaped seal structure support having an upper parting face and a lower parting face including one of said parting faces providing a flat face and the other of said parting faces including a radially extending groove therein, two semi-circular ring-like shaft-seal portions, said shaft-seal portions having an integrally formed flexible oil retaining lip adapted to engage a rotatable shaft in liquid sealing relation therewith, said shaft-seal portions having terminal ends, a pair of oppositely extending spoke-like cross-seal portions molded integrally with and extending radially outwardly from said terminal ends of one of said shaft-seal portions, said spoke-like cross-seal portions each being adapted to be received in said groove formed in the parting face of said seal structure support, said spoke-like cross-seal portions having a raised portion of material equal to from about 2.5% to about 12.5% of the volume of said groove extending above said parting face in combination upon engagement of said upper parting face with said lower parting face, said flat face acting on said raised portion forces said spoke-like cross-seal downwardly and outwardly in said groove below said lower parting face to cause engagement of said spoke-like cross-seal with said groove at a point in said groove below said lower parting face to form a fluid-tight fit, said spoke-like cross-seal portions being adapted to prevent the passage of liquid between said parting faces in a zone between said semi-circular shaft-seal portion and said spoke-like cross-seal portions.

2. A liquid seal structure for use within a two-piece semi-circular shaped seal structure support having an upper parting face and a lower parting face, including one of said parting faces providing a flat face and the other of said parting faces including a radially extending groove therein, two semi-circular ring-like shaft-seal portions, said shaft-seal portions having an integrally formed flexible oil retaining lip adapted to engage a rotatable shaft in liquid sealing relation therewith, said shaft-seal portions having terminal ends, a pair of oppositely extending spoke-like cross-seal portions molded integrally with and extending radially outwardly from said terminal ends of one of said shaft-seal portions, said spoke-like cross-seal portions each being received in said groove formed in said parting face of a seal structure support, a raised portion formed integrally with said cross-seal and extending longitudinally along the top surface of said cross-seal portion from a point near the outer perimeter of said shaft-seal to a point near the outer terminal end of said cross-seal portion, said raised portion terminating in said top surface remote from the sides of said cross-seal in combination upon engagement of said upper parting face with said lower parting face, said flat face acting on said raised portion forces said spoke-like cross-seal downwardly and outwardly in said groove below said lower parting face to cause engagement of said spoke-like cross-seal with said groove at a point in said groove below said lower parting face to form a fluid-tight fit, said spoke-like cross-seal portions being adapted to prevent passage of liquid between said parting faces in a zone between said semi-circular shaft-seal and said spoke-like cross-seal portions.

3. A split-seal structure comprising a shaft that projects from a two-piece seal structure support having an upper parting face and a lower parting face including one of said parting faces providing a flat face and the other of said parting faces including a radially extending groove therein, the axis of said shaft being in the plane of parting of the seal structure support, complementary semi-circular members each including means defining a main shaft-seal member terminating in terminal ends lying generally in a plane passing through the axis of said shaft, said seal structure support being formed for the reception of the respective semi-circular shaft-seal with the said terminal ends lying generally in the plane of said parting faces, said shaft-seal being provided with means to assure a liquid seal with said seal structure support; said arrangement being particularly characterized by one of said semi-circular shaft-seal members having formed integrally therewith a pair of cross-seal spoke-like members also of elastomeric material, said spoke-like members protruding a perceptible amount circumferentially from the terminals of one of said semi-circular shaft-seal members, each of said spoke-like members being adapted for reception in a complementary radially extending groove formed in the parting face of the corresponding one of said pairs of seal structure support pieces, said spoke-like members each being further particularly characterized by having an initial volume of from about 5% to about 10% of the volumetric capacity of said groove extending above said parting face forming a raised portion, said seal structure support and said spoke-like cross-seal members together in combination upon engagement of said upper parting face with said lower parting face, said flat face acting on said raised portion forces said spoke-like cross-seal downwardly and outwardly in said groove below said lower parting face to cause engagement of said spoke-like cross-seal with said groove at a point in said groove below said lower parting face to form a fluid-tight fit, said spoke-like cross-seal portions being effective to prevent passage of liquid between the respective parting faces of the seal structure support as well as between the semi-circular shaft-seal portion and the cross-seal portion.

4. A split seal structure for a shaft that projects from a two-piece seal structure support having an upper parting face and a lower parting face including one of said parting faces providing a flat face and the other of said parting faces including a radially extending groove therein, the axis of said shaft being in the plane of parting of the support pieces, comprising complementary semi-circular seal members each comprising means defining a main body portion terminating in planes lying generally coaxial to said shaft, a radially outwardly facing annular groove in each of said main body portions defined by a pair of spaced sides connected by a bottom portion, an inwardly extending flexible sealing portion integrally formed with said main body portion adapted to engage an embraceable shaft in liquid sealing relation therewith, a radially extending groove formed in said seal structure support, said arrangement being particularly characterized by one of said semi-circular seal members having formed integrally therewith a pair of cross-seal spoke-like members also of elastomeric material, said cross-seal spoke-like members protruding from each of the terminals of said semi-circular main body seal member, each of said cross-seal spoke-like members being partially received in a said radially extending groove formed in the parting face of one of a pair of said support pieces, said spoke-like members being further particularly characterized by having a volume the order of about 5% to about 10% of the volumetric capacity of said groove extending above said parting face forming a raised portion, said seal structure support and said spoke-like cross-seal members together in combination upon engagement of said upper parting face with said lower parting face, said flat face acting on said raised portion forces said spoke-like cross-seal downwardly and outwardly in said groove below said lower parting face to cause engagement of said spoke-like cross-seal with said groove at a point in said groove below said lower parting face to form a fluid-tight fit while maintaining said integral relation with said main body and effective to block the flow of liquid therepast.

5. A seal for preventing seepage of oil from between the mating surfaces of complementary first and second housing members which are drawn together to form a circular opening through which a rotatable shaft concentrically projects, the first housing member having a spaced pair of recesses in the mating surface thereof and an arcuate support groove in connection with the recesses, said second housing member having an arcuate support groove therein forming a continuation of the support groove in the first housing member, said seal being elastomeric in nature and comprising a pair of semi-circular bodies each having a pair of ends, the bodies respectively being received in the support grooves of the first and second housing members with the ends of the bodies in butting relation substantially at the mating surfaces of said housing members, both of said bodies engaging said rotatable shaft, and a pair of arms affixed to the semi-circular body received in the groove of the first housing member adjacent the ends of such body, said arms extending substantially radially out from one another and being received in the spaced recesses in said first housing member, each body comprising a lip having a face thereof engageable with the rotatable shaft, such lip having a substantially V-shaped under cut with one side of the V substantially parallel to the face of said lip, whereby the lip is resiliently urged forward into engagement with the shaft.

References Cited
UNITED STATES PATENTS

| | | | |
|---|---|---|---|
| 1,245,003 | 10/1917 | Mastin et al. | 277—207 |
| 1,942,705 | 1/1934 | Hubbard et al. | 277—206 X |
| 2,323,548 | 7/1943 | Lewis | 277—165 |
| 2,949,325 | 8/1960 | Nenzell | 277—207 X |
| 3,003,799 | 10/1961 | Marchionda | 277—206 X |
| 2,914,038 | 11/1959 | McKellar | 277—58 X |
| 2,323,548 | 7/1943 | Lewis | 288—3 X |
| 2,945,715 | 7/1960 | Burrell | 288—23 |
| 2,983,529 | 5/1961 | Price | 286—7 |
| 2,328,127 | 8/1943 | Crickmer | 286—16 |
| 2,647,002 | 7/1953 | Brumner | 288—2 |

FOREIGN PATENTS 823,613   11/1959   Great Britain.

SAMUEL ROTHBERG, *Primary Examiner.*

UNITED STATES PATENT OFFICE
CERTIFICATE OF CORRECTION

Patent No. 3,379,444  April 23, 1968

Olin Brummer et al.

It is certified that error appears in the above identified patent and that said Letters Patent are hereby corrected as shown below:

Column 5, line 1, cancel "each"; line 2, "a", first occurrence, should read -- said --; line 44, cancel "pieces".

Signed and sealed this 24th day of February 1970.

(SEAL)
Attest:

Edward M. Fletcher, Jr.
Attesting Officer

WILLIAM E. SCHUYLER, JR.
Commissioner of Patents